United States Patent
Ringseth

(10) Patent No.: US 9,841,958 B2
(45) Date of Patent: Dec. 12, 2017

(54) EXTENSIBLE DATA PARALLEL SEMANTICS

(75) Inventor: Paul F. Ringseth, Bellevue, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 1021 days.

(21) Appl. No.: 12/977,207

(22) Filed: Dec. 23, 2010

(65) Prior Publication Data

US 2012/0166772 A1 Jun. 28, 2012

(51) Int. Cl.
*G06F 9/45* (2006.01)
*G06F 9/44* (2006.01)

(52) U.S. Cl.
CPC .............. *G06F 8/436* (2013.01); *G06F 8/314* (2013.01)

(58) Field of Classification Search
USPC ........................................................ 717/149
See application file for complete search history.

(56) References Cited

U.S. PATENT DOCUMENTS

| 6,675,189 | B2 | 1/2004 | Rehg et al. | |
|---|---|---|---|---|
| 7,733,347 | B2* | 6/2010 | Tarditi et al. | 345/505 |
| 8,214,814 | B2* | 7/2012 | Barsness et al. | 717/151 |
| 8,341,611 | B2* | 12/2012 | Munshi et al. | 717/149 |
| 8,418,155 | B2* | 4/2013 | McAllister et al. | 717/149 |
| 8,495,603 | B2* | 7/2013 | Archer et al. | 717/149 |
| 2007/0294666 | A1* | 12/2007 | Papakipos et al. | 717/119 |
| 2008/0109795 | A1 | 5/2008 | Buck et al. | |
| 2008/0123559 | A1* | 5/2008 | Haviv et al. | 370/255 |
| 2008/0276220 | A1* | 11/2008 | Munshi et al. | 717/119 |
| 2009/0171999 | A1 | 7/2009 | McColl et al. | |
| 2009/0288086 | A1 | 11/2009 | Ringseth et al. | |
| 2010/0020071 | A1 | 1/2010 | Noyle | |
| 2010/0031241 | A1* | 2/2010 | Schwartz | 717/149 |
| 2010/0037035 | A1* | 2/2010 | Archer et al. | 712/28 |
| 2010/0205580 | A1* | 8/2010 | McAllister et al. | 717/106 |
| 2010/0241827 | A1* | 9/2010 | Yu et al. | 712/30 |
| 2010/0241828 | A1* | 9/2010 | Yu et al. | 712/30 |
| 2010/0275189 | A1* | 10/2010 | Cooke et al. | 717/146 |
| 2011/0004457 | A1* | 1/2011 | Haviv et al. | 703/21 |
| 2011/0078670 | A1* | 3/2011 | Viry | 717/149 |
| 2011/0242125 | A1* | 10/2011 | Hall et al. | 345/582 |

(Continued)

FOREIGN PATENT DOCUMENTS

| CN | 101657795 A | 2/2010 |
|---|---|---|
| CN | 101799760 A | 8/2010 |

(Continued)

OTHER PUBLICATIONS

NVIDIA Corp. CUDA Programming Guide. Ver. 3.2 Nov. 9, 2010.*

(Continued)

*Primary Examiner* — Matthew Brophy

(57) ABSTRACT

A high level programming language provides extensible data parallel semantics. User code specifies hardware and software resources for executing data parallel code using a compute device object and a resource view object. The user code uses the objects and semantic metadata to allow execution by new and/or updated types of compute nodes and new and/or updated types of runtime libraries. The extensible data parallel semantics allow the user code to be executed by the new and/or updated types of compute nodes and runtime libraries.

20 Claims, 4 Drawing Sheets

(56) References Cited

U.S. PATENT DOCUMENTS

| | | | |
|---|---|---|---|
| 2011/0270986 A1* | 11/2011 | Archer et al. | 709/226 |
| 2011/0314256 A1* | 12/2011 | Callahan, Ii et al. | 712/17 |
| 2011/0314444 A1* | 12/2011 | Zhang et al. | 717/106 |
| 2011/0314458 A1* | 12/2011 | Zhu et al. | 717/149 |
| 2012/0166771 A1* | 6/2012 | Ringseth | 712/220 |
| 2012/0166772 A1* | 6/2012 | Ringseth | 712/220 |

FOREIGN PATENT DOCUMENTS

| | | |
|---|---|---|
| JP | 11316688 A | 11/1999 |
| JP | 2010186468 A | 8/2010 |
| WO | 2009138812 A1 | 11/2009 |

OTHER PUBLICATIONS

Danelutto, Marco, et al. "Pal: exploiting java annotations for parallelism." Achievements in European Research on Grid Systems (2008): 83-96.*

Khronos OpenCL Working Group. "The OpenCL specification version 1.1." http://www.khronos.org/registry/cl/specs/opencl-1.1.pdf (Sep. 30, 2010).*

Wang, Perry H., et al. "EXOCHI: architecture and programming environment for a heterogeneous multi-core multithreaded system." Acm Sigplan Notices. vol. 42. No. 6. ACM, 2007.*

Che, Shuai, et al. "A performance study of general-purpose applications on graphics processors using CUDA." Journal of parallel and distributed computing 68.10 (2008): 1370-1380.*

"International Search Report", dated Sep. 27, 2012, Application No. PCT/US2011/067185, Filed Date: Dec. 23, 2011, pp. 9.

"STAPL: An Adaptive, Generic Parallel C++ Library", Retrieved at << http://people.etf.unsa.ba/~aakagic/articles/lcpc01.pdf >>, Languages and Compilers for Parallel Computing, 2003, pp. 1-17.

Callahan, David., "Design Considerations for Parallel Programming", Retrieved at << http://msdn.microsoft.com/en-us/magazine/cc872852.aspx >>, Oct. 2008, pp. 10.

Liao, et al., "Extending Automatic Parallelization to Optimize High-Level Abstractions for Multicore", Retrieved at << http://www.rosecompiler.org/ROSE_ResearchPapers/2009-ExtendingAutoParToOptimizeAbstractions-IWOMP.pdf >>, In Proceedings of the 5th international Workshop on OpenMP: Evolving OpenMP in an Age of Extreme Parallelism, Jun. 3-5, 2009, pp. 14.

Chien, et al., "ICC++—A C++ Dialect for High Performance Parallel Computing", Retrieved at <<http://plevyak.com/isotas-96.pdf >>, In Proceedings of the 2nd International Symposium on Object Technologies for Advanced Software, 1996, pp. 20.

Leijen, et al., "Optimize Managed Code for Multi-Core Machines", Retrieved at << http://msdn.microsoft.com/en-us/magazine/cc163340.aspx >>, Oct. 2007, pp. 10.

"Chinese First Office Action", dated Jan. 10, 2014, Application No. 201110436176.8, Filed date: Dec. 22, 2011, pp. 15.

"China Notice of Grant of Patent Right for Invention" and English Translation, dated Nov. 20, 2014, Application No. 201110436176.8, Filed date: Dec. 22, 2011, pp. 2.

"Chinese Second Office Action" and English Translation, dated Aug. 20, 2014, Application No. 201110436176.8, Filed date: Dec. 22, 2011, pp. 24.

"Office Action Issued in Japan Application No. 2013-546453", dated Jan. 20, 2016, 4 Pages.

"Supplementary Search Report Received for European Patent Application No. 11850729.2", dated Mar. 1, 2016, 11 Pages.

Ayguade, et al., "Extending OpenMP to Survive the Heterogeneous Multi-Core Era", In Proceedings of International Journal of Parallel Programming, vol. 38, Issue 5-6, Jun. 5, 2010, pp. 440-459.

* cited by examiner

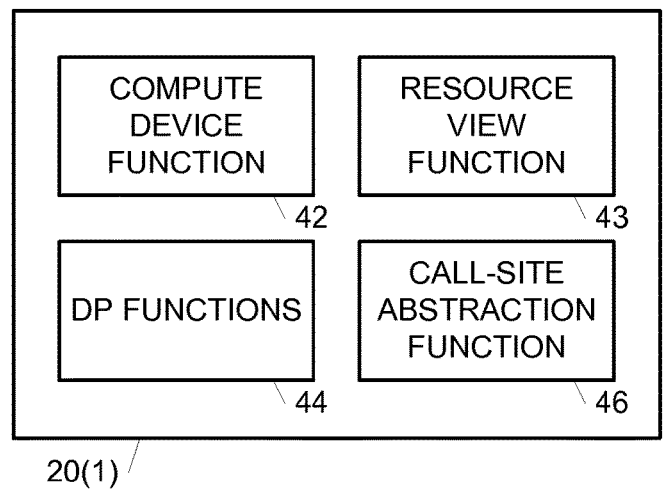
Fig. 3A
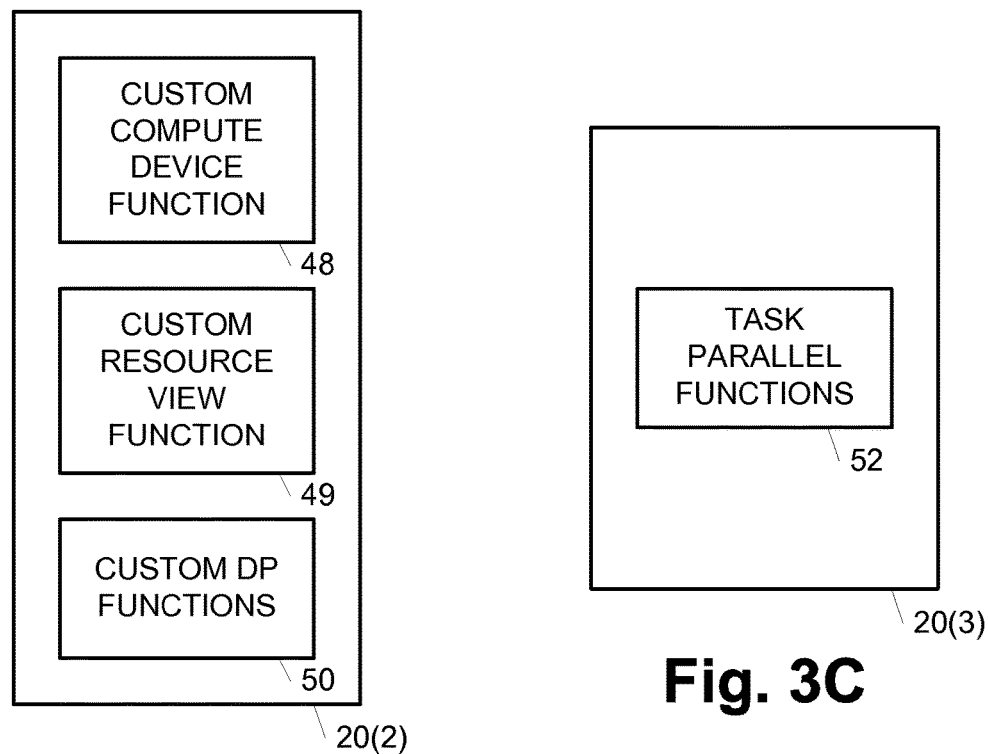
Fig. 3B
Fig. 3C

```
enum device_level {
    NONE,   // pick a default device
    CUSTOM, // extensibility point
    GPU,    // a GPU
    WARP,   // multi-threaded SSE/AVX based DX simulator
    REF,    // single threaded DX simulator
    NATIVE, // CPU-based or host
    SSE,    // vector units on current generation CPUs from AMD and Intel
    AVX,    // Intel Sandy Bridge
    LRB     // Intel Knights Ferry
};
```

```
enum resource_level {
    NONE,   // create a default resource_view for the compute_device
    NATIVE, // native semantics for device_level: NATIVE, SSE, AVX, LRB
    CUSTOM, // extensibility point
    DX11,   // DX11 semantics for device_level: GPU, WARP, REF
    DX11.1, // DX11.1 semantics (e.g. double division enabled) for
device_level: GPU, WARP, REF
    DX12    // DX12 semantics for device_level: GPU, WARP, REF
};
```

EXTENSIBLE DATA PARALLEL SEMANTICS

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier. Data parallel algorithms, however, are typically programmed with data parallel languages that have semantic restrictions that differ from general purpose programming languages.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides extensible data parallel semantics. User code specifies hardware and software resources for executing data parallel code using a compute device object and a resource view object. The user code uses the objects and semantic metadata to allow execution by new and/or updated types of compute nodes and new and/or updated types of runtime libraries. The extensible data parallel semantics allow the user code to be executed by the new and/or updated types of compute nodes and runtime libraries.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIGS. 3A-3C is are block diagrams illustrating embodiments of runtime libraries in a runtime environment that implements extensible data parallel semantics.

FIGS. 4A-4B are block diagrams illustrating embodiments of data structures that support extensible data parallel semantics.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
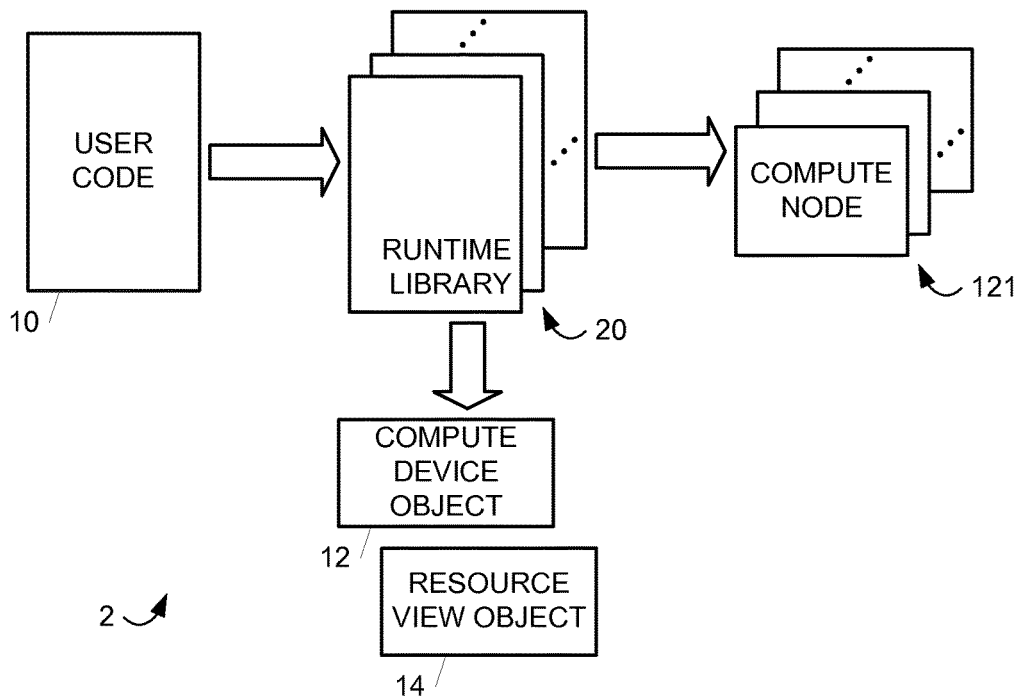
FIG. 1 is a block diagram illustrating an embodiment of a runtime environment with extensible data parallel semantics.
Figure 5:
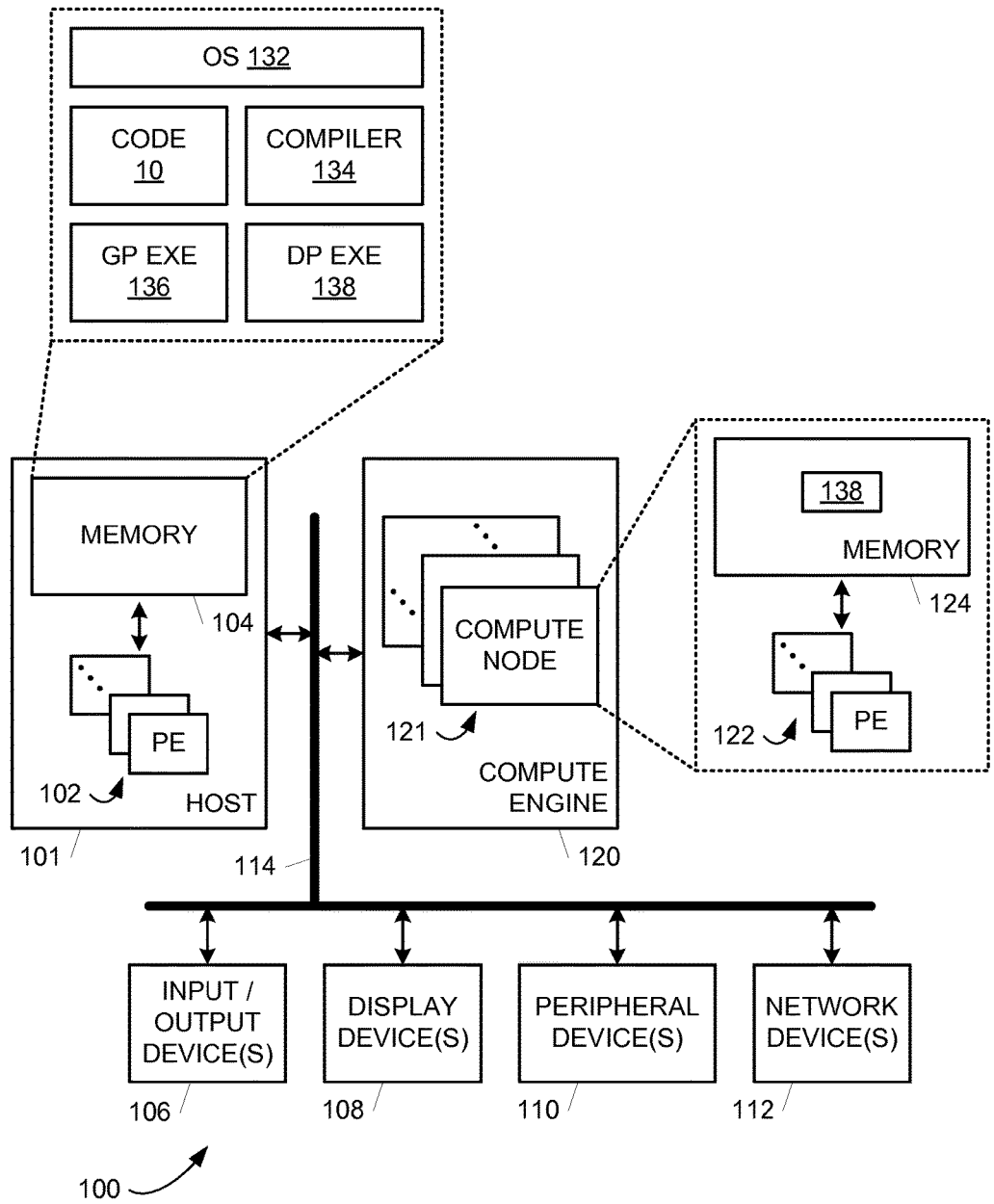
FIG. 5 is a block diagram illustrating an embodiment of a computer system configured to compile and execute data parallel code with extensible data parallel semantics.

FIG. 1 is a block diagram illustrating an embodiment of a runtime environment 2 with extensible data parallel semantics in a computer system such as computer system 100 shown in FIG. 5. Runtime environment 2 represents a runtime mode of operation in the computer system where the computer system is executing instructions from user code 10 and a set of one or more runtime libraries 20 on one or more compute nodes 121 (also shown in FIG. 5 and described in additional detail below).

Code 10 includes a sequence of instructions from a high level general purpose or data parallel programming language that may be compiled into one or more executables (e.g., DP executable 138 shown in FIG. 5) for execution by one or more compute nodes 121. Code 10 executes in conjunction with one or more runtime libraries 20 where runtime libraries 20 include data parallel application programming interfaces (APIs) that provide data parallel functions.

Code 10 causes a compute device object 12 to be generated from a runtime library 20 to specify a compute node 121 for executing at least a portion of code 10 and causes a resource view object 14 to be generated from a runtime library 20 to specify a runtime library 20 to be used in executing code 10. Compute device object 12 forms an abstraction of hardware that specifies a device level (i.e., a type of compute node 121). Resource view object 14 specifies a resource level that describes how to use the hardware specified by compute device object 12. Resource view object 14, for example, may describe different DirectX implementations (e.g., DirectX 11, DirectX 11.1, DirectX 12, and DirectX 13) or SSE/AVX implementations with native code generation or with WARP (a DirectX software emulator). Resource view object 14 may also include memory management and kernel execution services. The use of compute device object 12 and resource view object 14 along with associated semantic metadata provide extensible data parallel semantics for handling semantic changes of the underlying programming language of code 10. The extensible data parallel semantics allow code 10 to be executed with new and/or updated types of compute nodes 121 and new and/or updated types of runtime libraries 20. As a result, constructs of code 10 that were designed for use with specific types of compute nodes 121 may be executed by new and/or updated types of compute nodes 121.

In one embodiment, code 10 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. DP optimal compute nodes are typically graphic processing units (GPUs) or SIMD units of general purpose processors but may also include the scalar or vector execution units of general purpose processors, field programmable gate arrays (FPGAs), or other suitable devices in some computing environments. Using the GP language, a programmer may include both general purpose processor and DP source code in code 10 for execution by general purpose processors and DP compute nodes, respectively, and coordinate the execution of the general purpose processor and DP source code. Code 10 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language implementation may include rich linking capabilities that allow different parts of a program to be included in different modules. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 10 includes a sequence of instructions from a high level data parallel programming language (hereafter DP language) that form a program. A DP language provides a specialized language for programming a DP optimal compute node in a computing environment with one or more DP optimal compute nodes. Using the DP language, a programmer generates DP source code in code 10 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 10 may represent any suitable type of DP source code in this embodiment, such as an application, a library function, or an operating system service.

Figure 2:
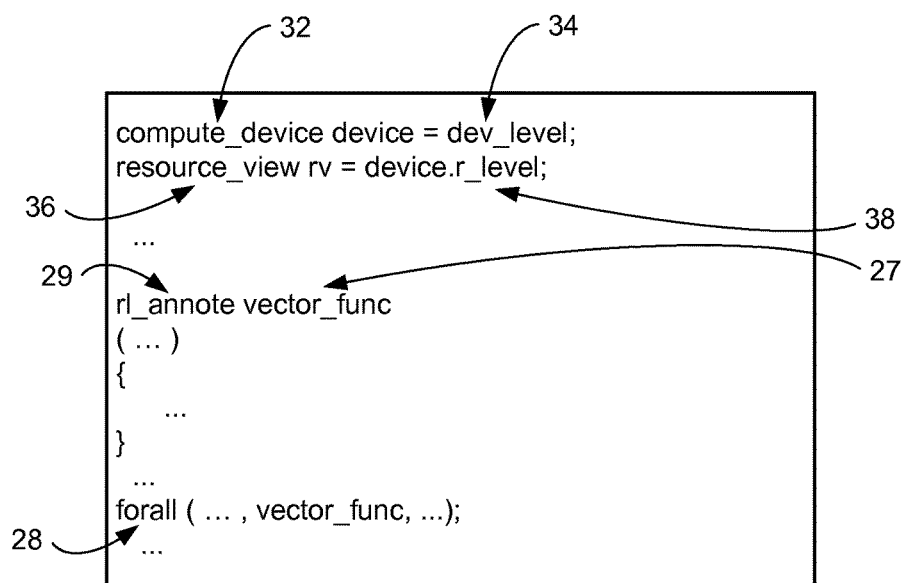
FIG. 2 is a computer code diagram illustrating an embodiment of code that implements extensible data parallel semantics.

Code 10 includes code portions designated for execution on a DP optimal compute node 121. A DP optimal compute node 121 has one or more computational resources with a hardware architecture that is optimized for data parallel computing (i.e., the execution of DP programs or algorithms). In one embodiment shown in FIG. 2 where code 10 is written with a GP language, the GP language allows a programmer to designate DP source code using an annotation 29 (e.g., rl_annote) when defining a vector function. The annotation 29 is associated with a function name 27 (e.g., vector_func) of the vector function that is intended for execution on a DP optimal compute node. Code 10 may also include one or more invocations 28 of a vector function (e.g., forall . . . , vector_func, . . . ) at a call site (e.g., forall, reduce, scan, or sort). A vector function corresponding to a call site is referred to as a kernel function. A kernel function may call other vector functions in code 10 (i.e., other DP source code) and may be viewed as the root of a vector function call graph. A kernel function may also use types (e.g., classes or structs) defined by code 10. The types may or may not be annotated as DP source code. In other embodiments, other suitable programming language constructs may be used to designate portions of code 10 as DP source code and/or general purpose processor code. In addition, annotations 29 may be omitted in embodiments where code 10 is written in a DP language.

Annotation 29 designates resource level semantics for the vector function. Annotation 29 allows a compiler to ensure that the semantic state of the vector function is compatible with the semantics and other characteristics of the target compute node 121 as reflected in compute device object 12 and resource view object 14. As the semantic restrictions ease over time, newer compute nodes 121 with fewer semantic restrictions may execute vector functions with older annotations 29 that indicate a higher level of semantic restrictions.

Runtime libraries 20 include any suitable type and/or number of libraries that provide task parallel and/or data parallel (DP) execution capabilities. For example, runtime libraries 20 may include DirectX runtime libraries and Concurrency Runtime libraries with Parallel Patterns Library (PPL) in one embodiment. Runtime libraries 20 provide application programming interfaces (APIs) or other suitable programming constructs that offer functions with task parallel and/or data parallel capabilities.

FIGS. 3A-3C illustrate embodiments of 20(1)-20(3), respectively, of runtime libraries 20 for use in runtime environment 2 shown in FIG. 1. In the embodiment of FIG. 3A, runtime library 20(1) includes a compute device function 42, a resource view function 43, data parallel (DP) functions 44, and a call-site abstraction function 46.

Compute device function 42 creates compute device object 12 (shown in FIG. 1) according to parameters supplied by user code 10. In particular, user code 10 passes a device level (e.g, device_level) that specifies a type of compute node for executing at least a portion of code 10 to create compute device object 12. In one embodiment, compute device function 42 recognizes the device levels shown in the data structure of FIG. 4A (i.e., none, custom, GPU, WARP, REF, NATIVE, SSE, AVX, and LRB). Accordingly, user code 10 may pass one of these device levels in this embodiment.

Resource view function 43 creates resource view object 14 (shown in FIG. 1) according to parameters supplied by user code 10. In particular, user code 10 passes a resource level (e.g, resource_level) that describes how to use the hardware specified by compute device object 12. Resource view function 43 recognizes the resource levels shown in the data structure of FIG. 4B (i.e., none, NATIVE, CUSTOM, DX11, DX11.1, and DX12) in one embodiment. Accordingly, user code 10 may pass one of these resource levels in this embodiment.

The device and resource levels of user code 10 indicate a level of semantic restrictions that user code 10 is required to meet. These semantic restrictions are assumed to decrease over time as new and updated compute nodes 121 and runtime libraries 20 are used to execute user code 10. Accordingly, compute nodes 121 and runtime libraries 20 are able to execute user code 10 if the compute nodes 121 and runtime libraries 20 have the same or fewer semantic restrictions than the device and resource levels of user code 10.

In one example, user code 10 creates compute device object 12 with a device level of GPU and a resource view object 14 with a resource level of DX11. User code 10 also includes at least one vector function with an annotation 29 that indicates DX11. The device level of GPU indicates that at least a portion of user code 10 is written for execution on a GPU, and the resource level of DX11 indicates that at least a portion of user code 10 is written for execution with a runtime library 20 that includes or otherwise supports DirectX 11. Accordingly, the vector function or functions conform to the semantic restrictions of DirectX 11 and may be executed with DirectX 11 on a GPU. If the resource view object 14 has a resource level of DX12 rather than DX11 (i.e., user code 10 is written for execution with a runtime library 20 that includes or otherwise supports DirectX 12), then annotation(s) 29 of the vector function(s) may be DX11, DX 11.1, or DX12 because DirectX 12 includes fewer semantic restrictions than DirectX 11 and DirectX 11.1.

In another example, user code 10 creates compute device object 12 with a device level of WARP and a resource view object 14 with a resource level of DX11 or DX12. User code 10 also includes at least one vector function with an annotation 29 that indicates DX11 if the resource level is DX11 or DX11, DX 11.1, or DX12 if the resource level is DX12. The device level of WARP indicates that at least a portion of user code 10 is written for execution by an SSE, AVX, or LRBni enabled DirectX simulator, and the resource level of DX11 or DX12 indicates that at least a portion of user code 10 is written for execution with a runtime library 20 that includes or otherwise supports DirectX 11 or DirectX 12. Accordingly, vector functions that conform to the semantic restrictions of DirectX 11 may be executed with DirectX 11 or higher on a WARP simulator and vector functions that conform to the semantic restrictions of DirectX 12 may be executed with DirectX 12 on a WARP simulator.

In a further example, user code 10 creates compute device object 12 with a device level of REF and a resource view object 14 with a resource level of DX11 or DX12. User code 10 also includes at least one vector function with an annotation 29 that indicates DX11 if the resource level is DX11 or DX11, DX 11.1, or DX12 if the resource level is DX12. The device level of REF indicates that at least a portion of user code 10 is written for execution by a single threaded CPU based DirectX simulator, and the resource level of DX11 or DX12 indicates that at least a portion of user code 10 is written for execution with a runtime library 20 that includes or otherwise supports DirectX 11 or DX12, respectively. Accordingly, vector functions that conform to the semantic restrictions of DirectX 11 may be executed with DirectX 11 or higher on a REF simulator and vector functions that conform to the semantic restrictions of DirectX 12 may be executed with DirectX 12 on a REF simulator.

The above examples use runtime libraries 20 that support DirectX. In other examples, other hardware implementations may be supported by indicating the hardware type as a device level and native as the resource level. For example, user code 10 may creates compute device object 12 with a device level of SSE to enable SSE vector units on CPUs from Intel and AMD, a device level of AVX to enable the Sandy Bridge CPU from Intel, or a device level of LRB to enable the Knights Ferry specialized data parallel optimized CPU from Intel. With these examples, user code 10 may create a resource view object 14 with a native level (i.e., NATIVE) where vector functions of user code 10 are unrestricted with regard to data parallel semantics but conform to the semantics of the underlying general purpose language (e.g., C++).

Referring back to runtime library 20(1) in FIG. 3A, DP functions 44 provide data parallel functions to implement call-sites such as forall, scan, reduce, and sort for selected types of compute nodes 121 such as GPUs or those with WARP or REF software simulators. With other types of compute nodes 121 (e.g., new and/or updated types), runtime library 20(1) provides a call-site abstraction function 46 that abstracts call-sites. Call-site abstraction function 46 may be used to implement call-site functionality for new and/or updated types of compute nodes 121.

As shown in FIG. 3B, a user may also provide one or more runtime libraries 20(2) that include a custom compute device function 48, a custom resource view function, and/or custom DP functions 50. Custom compute device function 48 may be implemented as an abstract base class and allows the user to provide semantic metadata for new and/or updated types of compute nodes 121 for executing user code 10. Custom resource view function 49 may also be implemented as an abstract base class and allows the user to provide new and/or updated resource levels that describe how to use the hardware for executing user code 10. Custom DP functions 50 allow the user to provide custom call-site implementations such as forall, scan, reduce, and sort that may be executed on the new and/or updated types of compute nodes 121.

To use runtime library 20(2) in one example, user code 10 creates compute device object 12 with a device level of CUSTOM and a resource view object 14 with a resource level of NATIVE. User code 10 also invokes custom compute device function 48 to provide the semantic metadata for the new and/or updated type of compute node 121. For call-sites, user code 10 may either use call-site abstraction function 46 of runtime library 20(1) to implement suitable call-site functionality for the compute node 121 or provide custom DP functions 50 that implement the call-sites.

To use runtime library 20(2) in another example, user code 10 creates compute device object 12 with a device level of NATIVE and a resource view object 14 with a resource level of CUSTOM. User code 10 also invokes custom resource view function 49 to provide a new and/or updated resource level that describes how to use the compute node 121 specified by compute device object 12 for executing user code 10. For example, the resource level may be a custom version of Intel® Thread Building Blocks (TBB). For call-sites, user code 10 may either use call-site abstraction function 46 of runtime library 20(1) to implement suitable call-site functionality for the compute node 121 or provide custom DP functions 50 that implement the call-sites.

To use runtime library 20(2) in further example, user code 10 creates compute device object 12 with a device level of CUSTOM and a resource view object 14 with a resource level of CUSTOM. User code 10 invokes custom compute device function 48 to provide the semantic metadata for the new and/or updated type of compute node 121. User code 10 also invokes custom resource view function 49 to provide a new and/or updated resource level that describes how to use the compute node 121 specified by compute device object 12 for executing user code 10. For call-sites, user code 10 may either use call-site abstraction function 46 of runtime library 20(1) to implement suitable call-site functionality for the compute node 121 or provide custom DP functions 50 that implement the call-sites.

To execute vector functions on a host (i.e., a non-vector CPU), user code 10 creates compute device object 12 with a device level of NATIVE and a resource view object 14 with a resource level of NATIVE. The device level of NATIVE indicates that at least a portion of user code 10 may be executed on a host. The resource level of NATIVE allows vector functions of user code 10 to be unrestricted with regard to data parallel semantics but conform to the semantics of the underlying general purpose language (e.g., C++). With host execution, user code 10 may either use call-site abstraction function 46 of runtime library 20(1) to implement suitable call-site functionality for the compute node 121 or provide custom DP functions 50 that implement the call-sites.

By providing extensible data parallel semantics where data parallel semantic restrictions are reduced or eliminated, integration (or heterogeneous programming) with task-based parallel programming runtime libraries 20 may be achieved. In particular, a runtime library 20(3) with task parallel functions 52, shown in FIG. 3C, may be used in conjunction with DP functions 44 (FIG. 3A). In one example where task parallel functions 52 represents Concurrency Runtime libraries (ConcRT) with Parallel Patterns Library (PPL), an implementation of forall using task parallel functions 52 may be generated for execution on a host using virtual processors. Likewise, implementations of foreach and transform from PPL and the C++ Standard Template Library (STL) may include range based signatures instead of linear iterators. In one embodiment, the options for range patterns are:

| | |
|---|---|
| enumerator | (basically the classical STL iterator pattern with forward, bidirectional, etc. variants) |
| recursive bisection | (task parallel) |
| chunking | (task parallel) |
| random access | (task or data parallel). |

The implementations of foreach and transform activate the range-trait or category using these range patterns.

In the data parallel form of foreach, the 'range' is the analogue of the compute domain in forall. A naïve implementation may call forall inside of foreach when presented with a random access 'range' with data parallel sub-trait. The limited number of kernel arguments in foreach or transform may be mitigated by utilizing lambda closures.

If a user wants to use a ConcRT implementation of forall functionality (even if it is not called forall) when foreach is called, assuming that a ConcRT foreach has not been implemented (otherwise it could be trivially baked-in—the version of forall called depends upon the semantic state of compute device object 12 and resource view object 14.), foreach may be specialized on a 'range' type that is created for ConcRT (or other custom) based data parallel call-site implementations.

The built-in 'range'-based foreach and transform implementations activate the 'range'-traits to decide which implementation pattern. To bring in custom data parallel call-site implementations, the new 'range' type may be overloaded. Thus, integration of data parallel functions 44 with task-based parallel programming runtime libraries 20 (e.g., runtime library 20(3) with task parallel functions 52) may be achieved with user extensibility using existing language mechanisms.

FIG. 5 is a block diagram illustrating an embodiment of a computer system 100 configured to compile and execute data parallel code 10 with extensible data parallel semantics.

Computer system 100 includes a host 101 with one or more processing elements (PEs) 102 housed in one or more processor packages (not shown) and a memory system 104. Computer system 100 also includes zero or more input/output devices 106, zero or more display devices 108, zero or more peripheral devices 110, and zero or more network devices 112. Computer system 100 further includes a compute engine 120 with one or more DP optimal or other types of compute nodes 121 where each DP optimal compute node 121 includes a set of one or more processing elements (PEs) 122 and a memory 124 that stores DP executable 138.

Host 101, input/output devices 106, display devices 108, peripheral devices 110, network devices 112, and compute engine 120 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a smart phone, a personal digital assistant (PDA), a mobile telephone, and an audio/video device. The components of computer system 100 (i.e., host 101, input/output devices 106, display devices 108, peripheral devices 110, network devices 112, interconnections 114, and compute engine 120) may be contained in a common housing (not shown) or in any suitable number of separate housings (not shown).

Processing elements 102 each form execution hardware configured to execute instructions (i.e., software) stored in memory system 104. The processing elements 102 in each processor package may have the same or different architectures and/or instruction sets. For example, the processing elements 102 may include any combination of in-order execution elements, superscalar execution elements, and data parallel execution elements (e.g., GPU execution elements). Each processing element 102 is configured to access and execute instructions stored in memory system 104. The instructions may include a basic input output system (BIOS) or firmware (not shown), an operating system (OS) 132, code 10, compiler 134, GP executable 136, and DP executable 138. Each processing element 102 may execute the instructions in conjunction with or in response to information received from input/output devices 106, display devices 108, peripheral devices 110, network devices 112, and/or compute engine 120.

Host 101 boots and executes OS 132. OS 132 includes instructions executable by the processing elements to manage the components of computer system 100 and provide a set of functions that allow programs to access and use the components. In one embodiment, OS 132 is the Windows operating system. In other embodiments, OS 132 is another operating system suitable for use with computer system 100.

When computer system executes compiler 134 to compile code 10, compiler 134 generates one or more executables—e.g., one or more GP executables 136 and one or more DP executables 138. In other embodiments, compiler 134 may generate one or more GP executables 136 to each include one or more DP executables 138 or may generate one or more DP executables 138 without generating any GP executables 136. GP executables 136 and/or DP executables 138 are generated in response to an invocation of compiler 134 with data parallel extensions to compile all or selected portions of code 10. The invocation may be generated by a programmer or other user of computer system 100, other code in computer system 100, or other code in another computer system (not shown), for example.

GP executable 136 represents a program intended for execution on one or more general purpose processing elements 102 (e.g., central processing units (CPUs)). GP executable 136 includes low level instructions from an instruction set of one or more general purpose processing elements 102.

DP executable 138 represents a data parallel program or algorithm (e.g., a shader) that is intended and optimized for execution on one or more data parallel (DP) optimal compute nodes 121. In one embodiment, DP executable 138 includes DP byte code or some other intermediate representation (IL) that is converted to low level instructions from an instruction set of a DP optimal compute node 121 using a device driver (not shown) prior to being executed on the DP optimal compute node 121. In other embodiments, DP executable 138 includes low level instructions from an instruction set of one or more DP optimal compute nodes 121 where the low level instructions were inserted by compiler 134. Accordingly, GP executable 136 is directly executable by one or more general purpose processors (e.g., CPUs), and DP executable 138 is either directly executable by one or more DP optimal compute nodes 121 or executable by one or more DP optimal compute nodes 121 subsequent to being converted to the low level instructions of the DP optimal compute node 121.

Computer system 100 may execute GP executable 136 using one or more processing elements 102, and computer system 100 may execute DP executable 138 using one or more PEs 122 as described in additional detail below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 132, code 10, compiler 134, GP executable 136, and DP executable 138. The instructions are executable by computer system 100 to perform the functions and methods of OS 132, code 10, compiler 134, GP executable 136, and DP executable 138 as described herein. Memory system 104 stores instructions and data received from processing elements 102, input/output devices 106, display devices 108, peripheral devices 110, network devices 112, and compute engine 120. Memory system 104 provides stored instructions and data to processing elements 102, input/output devices 106, display devices 108, peripheral devices 110, network devices 112, and compute engine 120. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Compute engine 120 is configured to execute DP executable 138. Compute engine 120 includes one or more compute nodes 121. Each compute node 121 is a collection of computational resources that share a memory hierarchy. Each compute node 121 includes a set of one or more PEs 122 and a memory 124 that stores DP executable 138. PEs 122 execute DP executable 138 and store the results generated by DP executable 138 in memory 124.

As noted above, a compute node 121 that has one or more computational resources with a hardware architecture that is optimized for data parallel computing (i.e., the execution of DP programs or algorithms) is referred to as a DP optimal compute node 121. Examples of a DP optimal compute node 121 include a node 121 where the set of PEs 122 includes one or more GPUs and a node 121 where the set of PEs 122 includes the set of SIMD units in a general purpose processor package. A compute node 121 that does not have any computational resources with a hardware architecture that is optimized for data parallel computing (e.g., processor packages with only general purpose processing elements 102) is referred to as a non-DP optimal compute node 121. In each compute node 121, memory 124 may be separate from memory system 104 (e.g., GPU memory used by a GPU) or a part of memory system 104 (e.g., memory used by SIMD units in a general purpose processor package).

Host 101 forms a host compute node that is configured to provide DP executable 138 to a compute node 121 for execution and receive results generated by DP executable 138 using interconnections 114. The host compute node includes is a collection of general purpose computational resources (i.e., general purpose processing elements 102) that share a memory hierarchy (i.e., memory system 104). The host compute node may be configured with a symmetric multiprocessing architecture (SMP) and may also be configured to maximize memory locality of memory system 104 using a non-uniform memory access (NUMA) architecture, for example.

OS 132 of the host compute node is configured to execute a DP call site to cause a DP executable 138 to be executed by a DP optimal or non-DP optimal compute node 121. In embodiments where memory 124 is separate from memory system 104, the host compute node causes DP executable 138 and one or more indexable types 14 to be copied from memory system 104 to memory 124. In embodiments where memory system 104 includes memory 124, the host compute node may designate a copy of DP executable 138 and/or one or more indexable types 14 in memory system 104 as memory 124 and/or may copy DP executable 138 and/or one or more indexable types 14 from one part of memory system 104 into another part of memory system 104 that forms memory 124. The copying process between compute node 121 and the host compute node may be a synchronization point unless designated as asynchronous.

The host compute node and each compute node 121 may concurrently execute code independently of one another. The host compute node and each compute node 121 may interact at synchronization points to coordinate node computations.

In one embodiment, compute engine 120 represents a graphics card where one or more graphics processing units (GPUs) include PEs 122 and a memory 124 that is separate from memory system 104. In this embodiment, a driver of the graphics card (not shown) may convert byte code or some other intermediate representation (IL) of DP executable 138 into the instruction set of the GPUs for execution by the PEs 122 of the GPUs.

In another embodiment, compute engine 120 is formed from the combination of one or more GPUs (i.e. PEs 122) that are included in processor packages with one or more general purpose processing elements 102 and a portion of memory system 104 that includes memory 124. In this embodiment, additional software may be provided on computer system 100 to convert byte code or some other intermediate representation (IL) of DP executable 138 into the instruction set of the GPUs in the processor packages.

In further embodiment, compute engine 120 is formed from the combination of one or more SIMD units in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the SIMD units in the processor packages.

In yet another embodiment, compute engine 120 is formed from the combination of one or more scalar or vector processing pipelines in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the scalar processing pipelines in the processor packages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
   at least one processor and a memory, the at least one processor configured to:
   generate, during runtime execution of user code, a compute device object and a resource view object in accordance with directives in the user code, the compute device object generated with a device level specified in the user code, the device level indicating a type of compute node, the resource view object generated with a first resource level specified in the user code, the first resource level indicating a type of runtime library for use in execution of the user code;
   obtain an annotation associated with a code portion in the user code, the annotation identifying the code portion as a data parallel function and includes a second resource level indicating a type of runtime library for use in execution of the code portion, wherein the first resource level differs from the second resource level; and
   execute the data parallel function using a compute node corresponding to the device level and the first resource level when the first resource level has fewer or same semantic restrictions as the second resource level.

2. The device of claim 1, wherein the first resource level specifies native, the first resource level indicates that semantic restrictions of the data parallel function conform to semantics of a general purpose programming language of the user code.

3. The device of claim 1, wherein the at least one processor is further configured to:
   detect that the device level is custom in the compute device object; and
   use a custom data parallel function in response to detecting that the device level is custom, wherein the custom data parallel function includes a custom implementation of the data parallel function for execution on a new and/or updated type of compute node.

4. The device of claim 1, wherein the at least one processor is further configured to:
   generate a call-site implementation for the compute node using a call-site abstraction function.

5. The device of claim 1, wherein the user code is written in a programming language with data parallel extensions.

6. The device of claim 1, wherein the user code is written in a high level data parallel programming language.

7. The device of claim 1, wherein the one or more data parallel compute nodes include at least one graphics processing unit.

8. The device of claim 1, wherein the at least one processor is further configured to:
   detect that the device level is custom in the compute device object; and
   use a custom compute device function in response to detecting that the device level is custom, wherein the custom device function includes semantic metadata that specifies a new and/or updated type of compute node.

9. A method performed by at least one processor in a computer system, the method comprising:
   associating at runtime a compute device object and a resource view object in accordance with directives in an application, the application includes a data parallel function, the data parallel function for execution on one or more compute nodes, the compute device object including a device level indicating a type of compute node to use in execution of the application and the resource view object including a first resource level identifying a type of runtime library to use in execution of the application;
   identifying an annotation applied to the data parallel function, the annotation including a second resource level indicating a type of runtime library for use with execution of the data parallel function, wherein the first resource level differs from the second resource level; and executing the data parallel function using at least one compute node associated with the device level and the first resource level when the first resource level has less or same semantic restrictions as the second resource level.

10. The method of claim 9 wherein the resource level corresponding to a resource view object is native when the data parallel function has unrestricted semantic restrictions.

11. The method of claim 9 further comprising:
generating data parallel executable code to include one of a custom compute device function or a custom data parallel function in response to detecting a device level of custom,
wherein the custom compute device function includes semantic metadata that specifies new and/or updated type of compute nodes,
wherein the custom data parallel function includes a custom implementation of the data parallel function for execution of a new and/or updated type of compute node.

12. The method of claim 9 further comprising:
generating a call-site implementation for the one or more data parallel compute nodes using a call-site abstraction function.

13. The method of claim 9 wherein the application is written in a high level general purpose programming language with data parallel extensions.

14. The method of claim 9 wherein the application is written in a high level data parallel programming language.

15. The method of claim 9 wherein the one or more compute nodes include at least one graphics processing unit.

16. The method of claim 9 wherein the one or more compute nodes include at least one general purpose processor.

17. A system, comprising:
at least one processor and a memory;
the memory including at least one module having processor-executable instructions that when executed by the at least one processor:
generates a compute device object and a resource view object in response to data parallel source code, the compute device object specifying a device level and the resource view object specifying a resource level, the device level indicating a type of compute node for executing the data parallel source code, a first resource level indicating a type of runtime library for use in execution of the data parallel source code;
obtain an annotation associated with a data parallel function in the data parallel source code, the annotation identifying a second resource level indicating a type of runtime library for use in execution of the data parallel function, wherein the first resource level differs from the second resource level;
and
performs the data parallel function using a compute node corresponding to the device level and the first resource level when the first resource level has same or fewer semantic restrictions of a programming language of the data parallel source code.

18. The system of claim 17, wherein the memory includes at least one user-defined runtime library, the user-defined runtime library including a custom compute device function that includes semantic metadata identifying new and/or updated types of compute nodes.

19. The system of claim 17, wherein the memory includes at least one user-defined runtime library, the user-defined runtime library including a custom resource view function that includes new and/or updated resource levels.

20. The system of claim 17, wherein the memory includes at least one user defined runtime library, the user-defined runtime library including a custom data parallel function that includes a custom implementation of a call-site function.

* * * * *